Dec. 30, 1969         C. W. HART ET AL           3,487,299
PULSE WIDTH MODULATED MONOSTABLE MULTIVIBRATOR MAGNETOMETER
Filed May 25, 1967
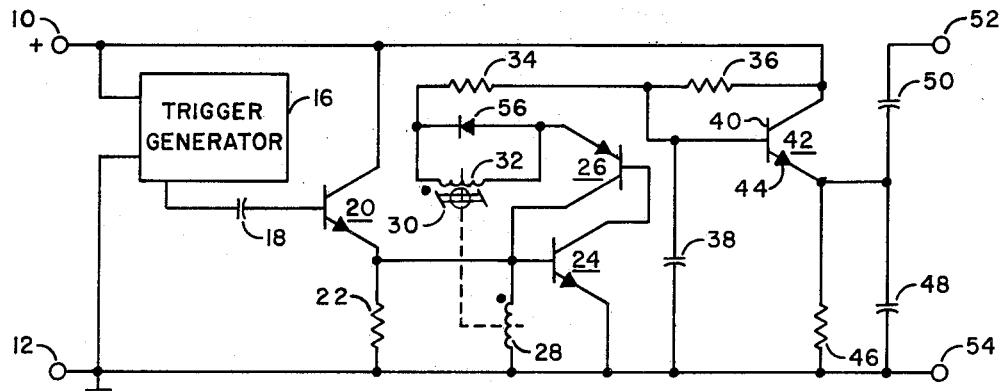
FIGURE 1
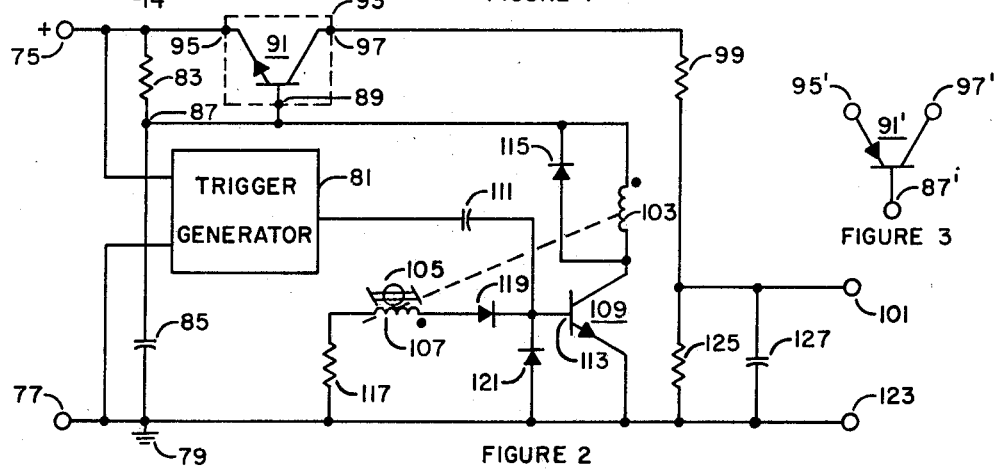
FIGURE 2
FIGURE 3
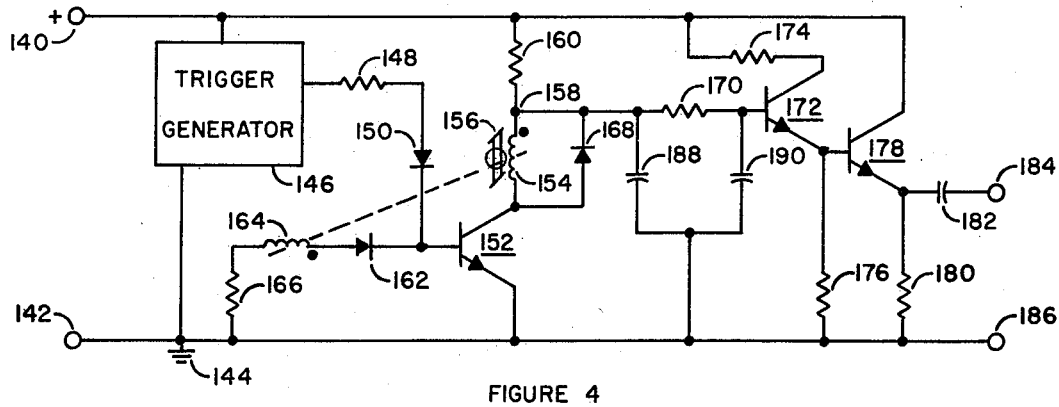
FIGURE 4
INVENTORS
CLIFTON W. HART
BY EUGENE E. ROSACKER
*Bruce C Lutz*
ATTORNEY United States Patent Office 3,487,299
Patented Dec. 30, 1969

1

3,487,299
PULSE WIDTH MODULATED MONOSTABLE
MULTIVIBRATOR MAGNETOMETER
Clifton W. Hart, Mound, and Eugene E. Rosacker, Richfield, Minn., assignors to Honeywell Inc., Minneapolis, Minn., a corporation of Delaware
Filed May 25, 1967, Ser. No. 642,665
Int. Cl. G01r 33/02
U.S. Cl. 324—43                                        4 Claims

ABSTRACT OF THE DISCLOSURE

A magnetometer which utilizes a concept of unidirectionally saturating a magnetic core periodically from a residual magnetic state to provide an output indicative of the environmental magnetic field. The output is a pulse width modulated signal which changes in pulse width in response to changes in the earth's magnetic field.

THE INVENTION

The present invention is concerned generally with electronic circuits and more specifically with a circuit operating as a magnetometer.

The prior art has many circuits for measuring the magnetic field of the unit. A majority of these circuits utilize clumsy and bulky apparatus with the exception of a few circuits such as may be found in an Electronics article starting on page 48 in the June 1, 1962 edition and a copending application filed by us. The copending application was filed on May 25, 1967, with a Ser. No. 642,666, and assigned to the same assignee as is the present invention. The present invention is an improvement over the referenced application and provides a pulse width modulated output through the use of a feedback winding so that the circuit is turned OFF immediately after saturation of the core. This results in lower power consumption and in a more usable output signal. Further, an output winding is eliminated thus reducing the cost of producing the circuit as compared to the more complicated versions of the circuit shown in the above referenced application.

It is therefore an object of this invention to provide improved magnetic field measuring apparatus.

Other objects and advantages of the present invention will be apparent from the reading of the specification and appended claims in conjunction with the drawings wherein FIGURES 1–4 are various circuit diagrams showing four of the many possible embodiments of the invention.

Referring to FIGURE 1 there is shown a positive power supply terminal 10 and a second power supply terminal 12 which is negative with respect to terminal 10 and is connected to ground 14. A trigger generator generally designated as 16 is connected to receive power from across the terminals 10 and 12. Trigger generator 16 further has an output signal supplied through a capacitor 18 to a base of an NPN transistor generally designated as 20 and having a collector connected to terminal 10 and an emitter connected through a resistor 22 to ground 14. The emitter of transistor 20 is connected to a base of an NPN transistor generally designated as 24 which is connected by its base and collector to the collector and base respectively of a PNP transistor generally designated as 26. The combination of transistors 24 and 26 form a controlled switch which will stay ON once it is turned ON but can be turned OFF even though there is current flow therethrough. A winding 28 of a saturable magnetic core 30, which may be a toroidal core and is shown as such, is connected in parallel with resistor 22. An emitter of transistor 24 is connected to ground 14. An emitter of transistor 26 is connected to terminal 10 through a series and sequential

2 combination of a winding 32 of saturable core 30, a resistance means 34 and a resistance means 36. The dotted ends of windings 28 and 32 are connected respectively to the base of transistor 24 and resistor 34. A capacitor 38 is connected from ground 14 to a junction point between resistors 34 and 36. This last-mentioned junction is also connected to a base 40 of a NPN transistor generally designated as 42 having a collector connected to terminal 10 and an emitter 44 connected through a resistor 46 to ground 14. A capacitor 48 is connected between emitter 44 and ground 14 while a capacitor 50 is connected between emitter 44 and an output terminal 52. A second output terminal 54 is connected in common with ground 14. A diode 56 is connected in parallel with winding 32 such that the anode thereof is connected to the emitter of transistor 26.

Referring now to FIGURE 2 it will be noted that a positive input terminal is designated as 75 while a second terminal which is negative with respect to terminal 75 is designated as 77 and is connected to ground 79. A trigger generator generally designated as 81 is connected to receive power from across terminals 75 and 77. A resistor 83 is connected in series with a capacitor 85 between terminals 75 and 77. A junction point 87 between resistor 83 and capacitor 85 is connected to a base 89 of a transistor generally designated as 91 and enclosed in a dashed line box 93. An emitter of transistor 91 is connected to a junction point 95 and from there to terminal 75. A collector of transistor 91 is connected to a junction point 97 on the edge of box 93 and from there through a resistor 99 to an output terminal 101. A winding 103 of a saturable core 105 having a second winding 107 is connected between junction point 87 and a collector of an NPN transistor generally designated as 109. The dotted end of winding 107 is connected to junction point 87. A capacitor 111 is connected between an output of trigger generator 81 and a base 113 of transistor 109. An emitter of transistor 109 is connected to ground 79. A diode 115 is connected in parallel with winding 103 with the anode thereof connected to a collector of transistor 109. A resistor 117 is connected between ground 79 and one end of winding 107 which has its other dotted end connected to an anode of a diode 119. The cathode of diode 119 is connected to a cathode of a diode 121 and to base 113. The anode of diode 121 is connected to ground 79. A second output terminal 123 is also connected to ground 79. A resistor 125 is connected in parallel with a capacitor 127 between output terminals 101 and 123.

Referring to FIGURE 3 it will be noted that there is shown only a transistor 91' with emitter, base and collector connected to terminals labeled respectively 95', 87', and 97'. This transistor 91' is substituted for the transistor 91 in FIGURE 2 to provide a different operational embodiment of FIGURE 2.

In FIGURE 4 a positive power terminal is designated as 140 while a negative terminal is designated as 142 and is connected to ground 144. A trigger generator generally designated as 146 is connected to receive power from across terminals 140 and 142. An output signal is supplied by trigger generator 146 through a resistor 148 in series with a diode 150 to a base of an NPN transistor generally designated as 152. An emitter of transistor 152 is connected to ground 144 while a collector of transistor 152 is connected through a winding 154 of a saturable magnetic core generally designated as 156 to a junction point 158. A resistor 160 is connected between junction point 158 and terminal 140. A diode 162 has its cathode connected to the cathode of diode 150 and to the base of transistor 152. A winding 164 of core 156 is connected between the anode of diode 162 and one end of a resistor 166 which is connected at the other end to ground 144. The windings 154 and 164 have their dotted ends connected respectively to point 158 and diode 162. A diode 168 is connected in parallel with winding 154 with the cathode thereof connected to junction point 158. A resistor 170 is connected between junction point 158 and a base of an NPN transistor designated as 172 and having a collector connected through a resistor 174 to terminal 140. An emitter of transistor 172 is connected through a resistor 176 to ground 144. The emitter of transistor 172 is also connected to a base of a second NPN transistor generally designated as 178 having a collector directly connected to terminal 140 and an emitter connected through a resistor 180 to ground 144. A capacitor 182 is connected between the emitter of transistor 178 and a first output terminal 184. A second output terminal 186 is connected to ground 144. A capacitor 188 is connected between junction point 158 and ground 144 while a capacitor 190 is connected between the base of transistor 172 and ground 144.

OPERATION

Referring to FIGURE 1 it will be noted that the trigger generator 16 supplies a pulse to transistor 20. Transistor 20 amplifies this pulse and supplies it to transistor 24 which is part of a semiconductor controlled switch. The switch turns ON and stays ON even though the pulse output from transistor 20 immediately disappears. Current will flow from power supply terminal 10 through the resistors 36 and 34 and the winding 32 to ground. As will be noticed, the dotted end of the winding 32 is connected to resistor 34 while the dotted end of winding 28 is connected to the base of transistor 24. Thus, with current flowing through winding 32, the base of transistor 24 is kept positive. However, as will be determined by those skilled in the art, this positive signal on the feedback winding is not necessary to the practice of the invention. Once the core saturates, winding 28 becomes a low D.C. impedance path, base to emitter of transistor 24. With base drive lost through the low impedance path transistor 24 turns OFF and in turn transistor 26 turns OFF. This eliminates current flow through winding 32. The diode 56 of course eliminates or reduces the effect of back EMF voltage appearing across winding 32. When the switch utilizing transistors 24 and 26 turns to an ON condition, the voltage at the base 40 of transistor 42 is suddenly lowered. When the switch is OFF, the transistor 42 is biased to an ON condition. However, when the switch turns ON and allows current flow through winding 32 to bring core 30 towards saturation, the voltage at the base of transistor 42 begins to decay, lowering the D.C. potential of condenser 38, which in turn lowers the potential on RC network comprising resistor 46 and capacitor 48 (R46+C48). Transistor 42 is used as a high to low impedance match. Thus, it will be realized that transistor 42 with RC network R46+C48 will provide a varying D.C. level which is indicative of the saturation characteristic of the core. This time for the core to saturate is in turn indicative of the magnet field strength as previously state. The core will saturate quicker if the magnetic field strength is high than if it is low and, accordingly, will produce a narrower width pulse than if the magnetic field strength is low.

Each of the circuits shown in this application were designed to detect changes in the earth's magnetic field as low as tenths of milligauss. The basic techniques of the device are described in the previously mentioned application which is copending with this application. Each of the present circuits provides a relatively high response to changes in the magnetic field from the resultant modulation of a D.C. pulse that drives a ferromagnetic core to saturation. A positive current applied to a ferromagnetic core drives the core to saturation. Transformer coupling between the core drive winding and a secondary winding on the core occurs only as the magnetic characteristics of the core are changing, and ceases when the core reaches saturation. The current in the secondary winding is used to prolong the drive pulse and terminated when the core is saturated. The core then returns to its residual magnetic level which is a function of core magnetic characteristics and the earth's magnetic field. A change in the ambient field is indicated above moves the core closer or farther from saturation and is thus accompanied by a change in the ON time of the saturation pulse.

Referring to FIGURE 2 it will be noted that transistor 91 is operated in the reverse beta configuration such that transistor 91 will turn ON when the base 89 is more positive than the collector thereof. As will be further noted, transistor 91 is always ON and is merely modulated in voltage between the emitter-collector junction thereof as a function of whether or not there is current flow through winding 103 of the core 105. The operation of this circuit is somewhat similar to that of FIGURE 1 and will briefly be described as follows. A pulse is applied from trigger generator 81 through capacitor 111 to turn transistor 109 to an ON condition. The feedback winding 107 will provide a positive signal through diode 119 to keep transistor 109 in the ON condition until the flux in the core 105 stops changing at the saturation point. The capacitor 85 helps supply the current for saturating the core 105. The diode 115 protects the circuit from effects of back EMF as the core returns to its residual magnetic state after saturation. As will be realized by those skilled in the art, when winding 107 stops supplying a positive pulse to transistor 109 it will automatically turn to an OFF condition. Transistor 91 acts as a low gain voltage amplifier and transfers the voltage on capacitor 85 to the RC network resistor 125+capacitor 127. The charge in capacitor 127 is the integrated output of transistor 91 and corresponds to the ON time of switch 109 and thus of the time between the start of current flow through winding 103 and the interruption thereof. Since capacitor 127 integrates the changes in current flow through transistor 91, the output is a voltage signal which varies in amplitude as a function of the ambient magnetic field in which core 105 is placed.

With the circuit of FIGURE 3 substituted for block 93 of FIGURE 2, it will be noted that transistor 91' is now operated as a high gain voltage amp and therefore the voltage on capacitor 85 to RC network resistor 125+capacitor 122 in the same fashion as FIGURE 2 to produce an output signal.

The initial portion of FIGURE 4 is much the same as the operation of FIGURE 2. In other words an input pulse from the trigger generator 146 through resistor 148 actuates transistor switch 152 and the feedback winding 164 keeps transistor 152 to an ON condition until saturation occurs. However, FIGURE 4 is different in its filtering network (resistor 170, capacitor 188, capacitor 190) and the impedance matching following the filter. A low frequency change in the ambient magnetic field changes the voltage level on C188 causing a voltage across resistor 170, change in voltage on C190. This change is impedance match by transistors 172 and 178 developing a signal across capacitor 182.

While several embodiments of the invention have been illustrated in the specification and drawings, we do not wish to be limited to these specific embodiments. The invention lies in the use of a main winding around a sensing saturable magnetic core and a feedback winding utilized to determine when the switch will turn to an OFF condition so as to provide an output signal which is pulse width modulated with the pulse width changing directly as a function of the ambient magnetic field.

It is obvious that many other embodiments of the invention described in the last paragraph will be apparent to those skilled in the art and we wish to be limited only by the scope of the appended claims wherein we claim:

1. A magnetometer for measuring ambient magnetic field utilizing a toroidal core normally in a residual saturation state comprising, in combination:

signal means for supplying periodically recurring pulses of a first polarity;

toroidal magnetic core means comprising only first and second windings for saturating only after current is applied through said first winding for a sufficient period of time wherein the time is variable depending upon the ambient magnetic field;

terminal means for supplying power;

switch means connected in series with said first winding and connected to said signal means and to said terminal means for allowing current flow through said first winding upon receipt of a pulse from said signal means and maintaining said current flow until a pulse of a polarity opposite said first polarity is received; and connection means for connecting said second winding to said switch means whereby a pulse is supplied thereto of a polarity opposite said first polarity upon saturation of said core.

2. Apparatus as claimed in claim 1 comprising in addition detection means for providing an output signal indicative of the relative amount of time current flows through said core means.

3. A magnetometer for measuring ambient magnetic field utilizing a toroidal core normally in a residual saturation state comprising, in combination:

signal means for supplying periodically recurring pulses of a first polarity;

core means comprising only first and second windings for saturating only after current is applied through said first winding for a sufficient period of time wherein the time is variable depending upon the ambient magnetic field;

terminal means for supplying power;

switch means connected in series with said first winding and connected to said signal means and to said terminal means for allowing current flow through said first winding upon receipt of a pulse from said signal means and maintaining said current flow until an input signal is no longer received; and connection means for connecting said second winding to said switch means in a feedback relationship whereby a feedback signal of the same polarity as said first polarity is applied until saturation of said core occurs.

4. Apparatus as claimed in claim 3 comprising in addition detection means for providing an output signal indicative of the relative amount of time current flows through said core means.

References Cited

UNITED STATES PATENTS

| | | | |
|---|---|---|---|
| 3,281,670 | 10/1966 | Myers et al. | 307—237 X |
| 2,991,414 | 7/1961 | Tillman | 324—43 |
| 3,005,158 | 10/1961 | Spinrad. | |
| 3,040,247 | 6/1962 | Van Allen | 324—43 |

RODNEY D. BENNETT, JR., Primary Examiner

D. C. KAUFMAN, Assistant Examiner

U.S. Cl. X.R.

307—265, 273, 278, 309; 332—12